US012683258B2

(12) United States Patent
Wang et al.

(10) Patent No.: US 12,683,258 B2
(45) Date of Patent: Jul. 14, 2026

(54) TRIPLE-MODE RESONATOR AND WAVEGUIDE FILTER COMPRISING THE SAME

(71) Applicant: Telefonaktiebolaget LM Ericsson (publ), Stockholm (SE)

(72) Inventors: Honglan Wang, Beijing (CN); Jun Fu, Beijing (CN); Xu Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 72 days.

(21) Appl. No.: 18/712,234

(22) PCT Filed: Dec. 1, 2021

(86) PCT No.: PCT/CN2021/134833

§ 371 (c)(1),
(2) Date: May 21, 2024

(87) PCT Pub. No.: WO2023/097569

PCT Pub. Date: Jun. 8, 2023

(65) Prior Publication Data

US 2025/0007140 A1 Jan. 2, 2025

(51) Int. Cl.
*H01P 1/208* (2006.01)
*H01P 7/10* (2006.01)

(52) U.S. Cl.
CPC ............ *H01P 1/2086* (2013.01); *H01P 7/105* (2013.01)

(58) Field of Classification Search
CPC ...... H01P 1/2086; H01P 7/105; H01P 1/2088; H01P 7/065; H01P 1/2082

(Continued)

(56) References Cited

U.S. PATENT DOCUMENTS 5,783,979 A 7/1998 Andoh et al.
9,972,882 B2 5/2018 Cooper et al.

(Continued)

FOREIGN PATENT DOCUMENTS

CN 106450603 A 2/2017
CN 109244606 A 1/2019
CN 111430854 A 7/2020

OTHER PUBLICATIONS

Extended European Search Report for European Patent Application No. 21966003.2 dated Aug. 11, 2025, 11 pages.

(Continued)

*Primary Examiner* — Jorge L Salazar, Jr.
(74) *Attorney, Agent, or Firm* — Sage Patent Group

(57) ABSTRACT

A triple-mode resonator includes a main body having a block of a dielectric material and an overlay of conductive material on the block; a first set of coupling windows provided in the overlay of conductive material on a first face of the main body to be coupled with a first single-mode resonator, and through which signals can be coupled into the main body; and a second set of coupling windows provided in the overlay of conductive material on a second face of the main body to be coupled with a second single-mode resonator, and through which signals can be coupled out of the main body, wherein the first and second sets of coupling windows each include an annular coupling window and a plurality of neighboring coupling windows located adjacent to the annular coupling window.

19 Claims, 5 Drawing Sheets

(58) Field of Classification Search
USPC .............................. 333/219.1, 212, 227, 230
See application file for complete search history.

(56) References Cited

U.S. PATENT DOCUMENTS

| | | | | |
|---|---|---|---|---|
| 2015/0380794 | A1* | 12/2015 | Cooper ................. | H01P 1/2086 333/208 |
| 2016/0006105 | A1 | 1/2016 | Cooper et al. | |
| 2018/0219268 | A1 | 8/2018 | Cooper et al. | |
| 2021/0194108 | A1 | 6/2021 | Hendry | |

OTHER PUBLICATIONS

Hendry et al., "Triple-Mode Ceramic Cavity Filters With Wide Spurious-Free Performance", IEEE Transactions on Microwave Theory and Techniques, vol. 65, No. 10, Oct. 2017, pp. 3780-3788.
International Search Report and Written Opinion of the International Searching Authority, PCT/CN2021/134833, mailed Aug. 25, 2022, 11 pages.

* cited by examiner

TRIPLE-MODE RESONATOR AND WAVEGUIDE FILTER COMPRISING THE SAME

CROSS REFERENCE TO RELATED APPLICATIONS

This application is a 35 U.S.C. § 371 national stage application of PCT International Application No. PCT/CN2021/134833 filed on Dec. 1, 2021, the disclosure and content of which is incorporated by reference herein in its entirety.

TECHNICAL FIELD

The present disclosure generally relates to the technical field of a filter and, more particularly, to a triple-mode resonator and a waveguide filter comprising the triple-mode resonanor.

BACKGROUND

This section introduces aspects that may facilitate better understanding of the present disclosure. Accordingly, the statements of this section are to be read in this light and are not to be understood as admissions about what is in the prior art or what is not in the prior art.

With the development of 5G communication, the multiple-input and multiple-output (MIMO) technology is widely used in a Sub-6 GHz base station product, which requires a lot of filter units (FUs) to be integrated with an antenna unit (AU) or a radio unit (RU). For saving cost and space, FUs are usually soldered onto a radio mother board, a low pass filter (LPF) board, an antenna calibration (AC) board or a power splitter board, which means smaller and lighter FUs are quite in demand.

In traditional base stations, metal cavity FUs are widely used because of their high value of Q-factor and power handling performance, but there is still room for improvement in terms of size and weight of a FU for a 5G advanced radio system. A ceramic waveguide (CWG) filter, which is formed from ceramic block coated with conducting material, e.g. silver, is widely used also. Ceramic property of high permittivity reduces the guide wavelength, which makes a CWG filter have a smaller physical size than a conventional metal cavity filter for a specific resonant frequency.

A CWG filter, especially a multi-mode CWG filter, is highly recommended for a 5G FU, due to its high performance, light weight, small size and easy integration.

Currently, the value of Q-factor of a single mode CWG filter is lower than that of a metal cavity filter of the same size. For a single mode CWG filter, in order to increase its value of Q-factor, the size of the cavity have to be increased, which goes against the basic design needs for reduction in size.

Also, it is found that one multi-mode cavity can contribute a radio frequency (RF) feature that can be provided by several single-mode cavities, and the size of one multi-mode cavity is larger than one single-mode-cavity, but smaller than the summed size of the several single-mode cavities. That is, it is possible for a multi-mode filter that the Q-factor can be improved and at the mean time the total size can be reduced. As compared with a single-mode CWG filter, the value of Q-factor of a multi-mode CWG filter can be increased to be higher by 100%-120% with the volume being reduced by 30%-50%. Reduced volume of a multi-mode CWG filter allows integrating it with an AU, a RU or a macro station duplexer in a more convenient way. Hence, a multi-mode CWG filter is advantageous over a single-mode CWG filter in terms of achieving balance between high value of Q-factor and small size.

However, an existing multi-mode CWG has limited band width, which therefore cannot be applied to a wideband radio having high demands for wide band filters.

Another problem with existing multi-mode CWG filters is that most single-mode CWG filters make use of blind holes or grooves to realize a negative/capacitive coupling, but this coupling method for single-mode CWG filters is neither convenient for multi-mode coupling, nor handy in coupling value control and in control of transmission zero settings. Furthermore, current multi-mode CWG filters suffer very bad harmonic performance due to their coupling method. Also, transmission zero settings cannot be achieved flexibly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for a waveguide filter with improved control of settings of transmission zero, improved value of Q-factor, low insertion loss, high power capacity and improved harmonic performance.

According to a first aspect of the disclosure, there is provided a triple-mode resonator, comprising: a main body having a block of a dielectric material and an overlay of conductive material on the block; a first set of coupling windows, which are provided in the overlay of conductive material on a first face of the main body to be coupled with a first single-mode resonator, and through which signals can be coupled into the main body; and a second set of coupling windows, which are provided in the overlay of conductive material on a second face of the main body to be coupled with a second single-mode resonator, and through which signals can be coupled out of the main body. The first and second sets of coupling windows each comprise an annular coupling window and a plurality of neighboring coupling windows located adjacent to the annular coupling window. When viewed in cross-section, a substantially closed region defined by an inner edge of each annular coupling window is positioned substantially within an electric field-concentrated area respectively associated with the first or second face of the main body, and each annular coupling window is configured such that predetermined settings of parasitic zero point can be obtained by its cooperation with neighboring coupling windows on the first and second faces of the main body.

In an embodiment of the disclosure, at least one of the annular coupling windows, when viewed in cross-section, is substantially in a circular annular shape or a square annular shape or a polygonal annular shape.

In an embodiment of the disclosure, the first and second sets of coupling windows each comprise two or three neighboring coupling windows.

In an embodiment of the disclosure, the main body has a cuboid shape defining three orthogonal axes each substantially perpendicular to a respective face of the main body, and the neighboring coupling windows are positioned substantially in corner areas of the first or second face of the main body.

In an embodiment of the disclosure, at least one neighboring coupling window, when viewed in cross-section, is in a substantially triangle or rectangular or square shape, having at least two adjacent edges orthogonal to each other and each extending along one of the three orthogonal axes x, y, z.

In an embodiment of the disclosure, the at least one neighboring coupling window, when viewed in cross-section, has a chamfered corner which is located adjacent to and points to a corresponding annular coupling window.

In an embodiment of the disclosure, the at least one neighboring coupling window, when viewed in cross-section, has an arc-shaped corner which is located adjacent to and points to a corresponding annular coupling window and which has an arc center located outside its boundary.

In an embodiment of the disclosure, the first face is opposite to the second face.

In an embodiment of the disclosure, the dielectric material is ceramic.

According to a second aspect of the disclosure, there is provided a waveguide filter comprising a triple-mode resonator as stated in the above, a first single-mode resonator comprising a block of a dielectric material and an overlay of conductive material on the block, and a second single-mode resonator comprising a block of a dielectric material and an overlay of conductive material on the block. The triple-mode resonator is sandwiched between the first and second single-mode resonators in such a manner that the triple-mode resonator is coupled with the first single-mode resonator via the first set of coupling windows and is coupled with the second single-mode resonator via the second set of coupling windows.

In an embodiment of the disclosure, the waveguide filter further comprises a third single-mode resonator comprising a block of a dielectric material and an overlay of conductive material on the block, and the third single-mode resonator is coupled with the first single-mode resonator via corresponding coupling windows formed in the overlay of conductive material on their abutting faces.

In an embodiment of the disclosure, the coupling windows for the coupling between the third single-mode resonator and the first single-mode resonator are in the form of circular slots or channels.

In an embodiment of the disclosure, on a face of the third single-mode resonator facing away from the first single-mode resonator, an input means is connected to the dielectric material of the third single-mode resonator for supplying a signal.

In an embodiment of the disclosure, a central axis of the input means is substantially coincident with a central axis of the coupling windows between the third and first single-mode resonators.

In an embodiment of the disclosure, the waveguide filter further comprises a fourth single-mode resonator comprising a block of a dielectric material and an overlay of conductive material on the block, and the fourth single-mode resonator is coupled with the second single-mode resonator via corresponding coupling windows formed in the overlay of conductive material on their abutting faces.

In an embodiment of the disclosure, on a face of the fourth single-mode resonator facing away from the second single-mode resonator, an output means is connected to the dielectric material in the fourth single-mode resonator for outputting a filtered signal.

In an embodiment of the disclosure, the third single-mode resonator and the fourth single-mode resonator are mirror symmetrical to each other, and the input means and the output means are coaxial with respect to each other.

In an embodiment of the disclosure, at least one neighboring coupling window of the first or second set of coupling windows on the triple-mode resonator, when viewed in cross-section, has an arc-shaped corner which is located adjacent to and points to a corresponding annular coupling window and which has an arc center located outside its boundary, and a central axis of the input means extends through the arc center of the arc-shaped corner.

In an embodiment of the disclosure, the waveguide filter is formed into one piece by casting or by injection molding.

With the resonator of the present disclosure, the Q-factor of the triple-mode filter can be significantly improved as compared with the same sized cascaded single-mode filter. Consequently, the improved Q-factor results in an improved insertion loss for a waveguide filter. Also, the proposed coupling structures enables controlling the cross-coupling and the settings of the transmission zero easily. Negative coupling and positive coupling can be more flexibly established, routed and placed. Thus, predetermined settings of near-end parasitic zero point and desired wideband coupling can be achieved easily.

By the waveguide filter of the present disclosure, near band attenuation performance can be realized in a better manner with less negative couplings, which benefits both near band spur and in-band insertion loss. Also, the harmonic parameter of the filter can be improved. Moreover, it allows simplifying the low-pass filter design, and thus improving the overall FU performance, especially insertion loss.

Additionally, the multi-mode CWG filter of the present disclosure can be flexibly designed so as to be installed within an AU or macro station. Due to the benefit in both production consistency and accuracy, production efficiency can be improved with production cost being reduced.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
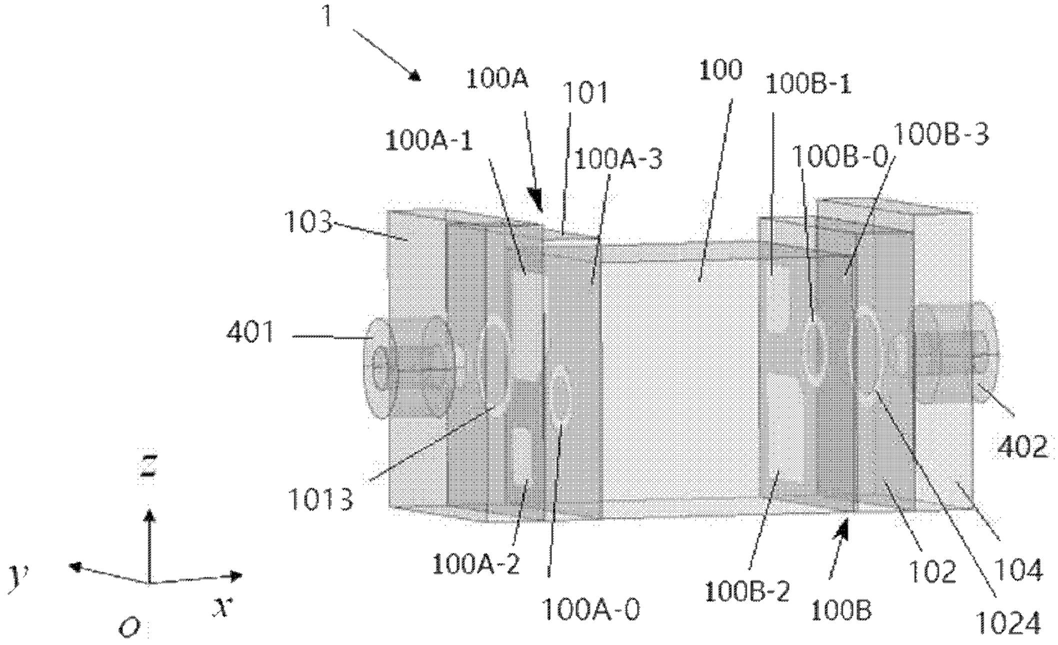
FIG. 1 is a perspective view of a waveguide filter according to the present disclosure.
Figure 2:
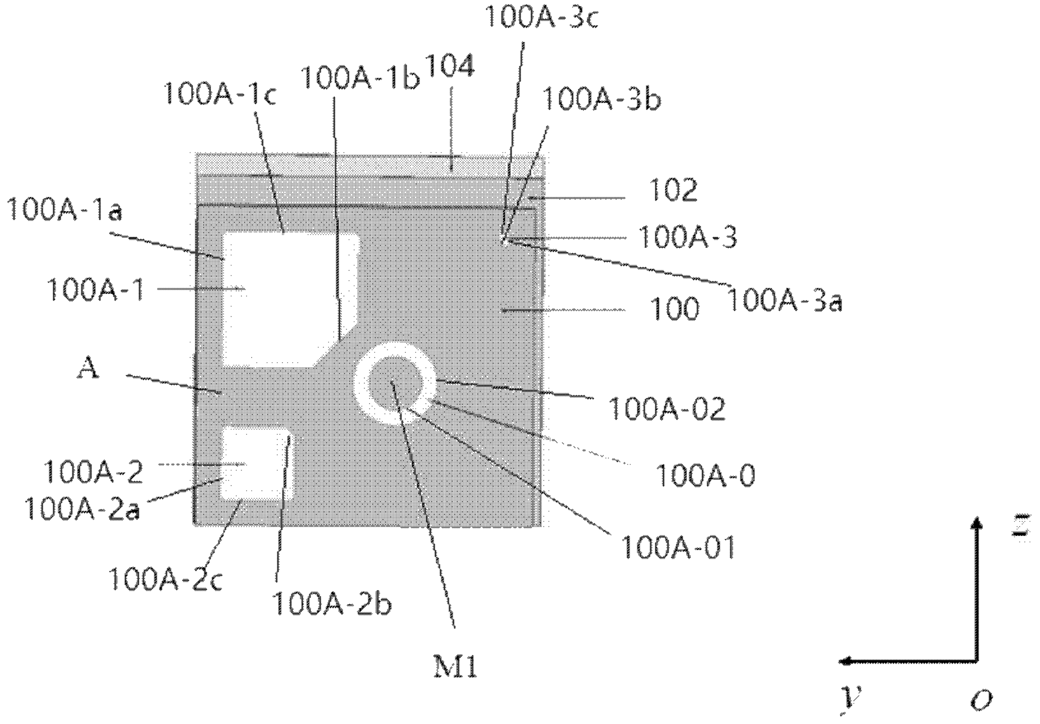
FIG. 2 is a side view of a portion of the waveguide filter as shown in FIG. 1.

FIG. 1 shows a perspective view of the waveguide filter 1 of the present disclosure, comprising multiple resonators coupled in series. FIG. 2 shows some resonators in a side view.

The waveguide filter 1 comprises a triple-mode resonator 100, and a first single-mode resonator 101 (i.e. a first intermediate resonator) and a second single-mode resonator 102 (i.e. second intermediate resonator) coupled to the triple-mode resonator on its opposite ends along the direction of x axis. A third single-mode resonator is coupled as an input resonator 103 to the first intermediate resonator 101. A fourth single-mode resonator is coupled as an output resonator 104 to the second intermediate resonator 102. In the embodiment shown in FIG. 1, the first and second intermediate resonators 101, 102 and the input and output resonators 103, 104 are single-mode resonators each comprising a block made of dielectric material (such as ceramic material) with suitable dielectric properties and an overlay of conductive material on the block. The input and output resonators 103, 104 and the first and second intermediate resonators 101, 102 can be in any shape. In the illustrated example, the input and output resonators 103, 104 and the first and second intermediate resonators 101, 102 each are in the form of a rectangular cuboid defining three orthogonal axes substantially aligned with its faces, as shown by the axes x, y, z in FIG. 1. In one embodiment, the overlay of conductive material is applied to the dielectric block, for example, through surface metallization, or formed before injecting the molten dielectric material thereinto. The conductive material can be silver, gold, copper or the like. Coupling windows are formed in the overlay of conductive material on their abutting faces so as to allow coupling of signals to and from the resonators respectively.

The input resonator 103 has an input means 401 connected to its dielectric block to allow an unfiltered signal to be applied thereto, and the output resonator 104 has an output means 402 connected to its dielectric block to allow a filtered signal to be output therefrom.

In the waveguide filter 1 shown in FIG. 1, the triple-mode resonator 100 is sandwiched between the first intermediate resonator 101 and the second intermediate resonator 102. Similar to those single-mode resonators 101, 102, 103, 104, the main body of the triple-mode resonator 100 comprises a block made of a dielectric material (such as ceramic material) with suitable dielectric properties and an overlay of conductive material on the block. In the illustrated example, the dielectric block of the triple-mode resonator 100 may be embodied in the form of a cuboid (or a cube) having faces substantially aligned with the three orthogonal axes x, y, z. The overlay of conductive material such as silver, gold, copper or the like is applied to the dielectric block, for example, by means of surface metallization. Coupling windows are formed in the overlay of conductive material on its faces abutting against the first and second intermediate resonators 101, 102 so as to allow coupling of signals to and from the triple-mode resonator 100.

In the present disclosure, coupling windows can be embodied as coupling apertures, for example, by carving in the metal coating (i.e. the overlay of conductive material) over the dielectric block, or embodied as channels, which for example are formed during a ceramic injection molding process of the resonators). Coupling windows may have an extension length measured along the axis x direction. Thus, for sake of clarity, the term "shape" for coupling windows refer to a shape when the coupling windows are viewed in cross-section.

Referring to FIGS. 1-2, all the resonators 103, 101, 100, 102, 104 are coupled in series by communication of corresponding coupling windows on abutting faces thereof. In the example shown in FIG. 1, the input resonator 103 is coupled to the first intermediate resonator 101 via a coupling window 1013 in the form of a circular slot or channel. The first intermediate resonator 101 is coupled to the triple-mode resonator 100 via a first set of coupling windows 100A, and the triple-mode resonator 100 is coupled to the second intermediate resonator 102 via a second set of coupling windows 100B. The second intermediate resonator 102 is coupled to the output resonator 104 via a coupling window 1024 in the form of a circular slot or channel.

Still referring to FIGS. 1-5, the first set of coupling windows 100A are provided in the overlay of conductive material on a first face A of the main body of the triple-mode resonator 100 as input coupling windows. The second set of coupling windows 100B are provided in the overlay of conductive material on a second face B, opposite to the first face A, of the main body of the triple-mode resonator 100 as output coupling windows.

Figure 3:
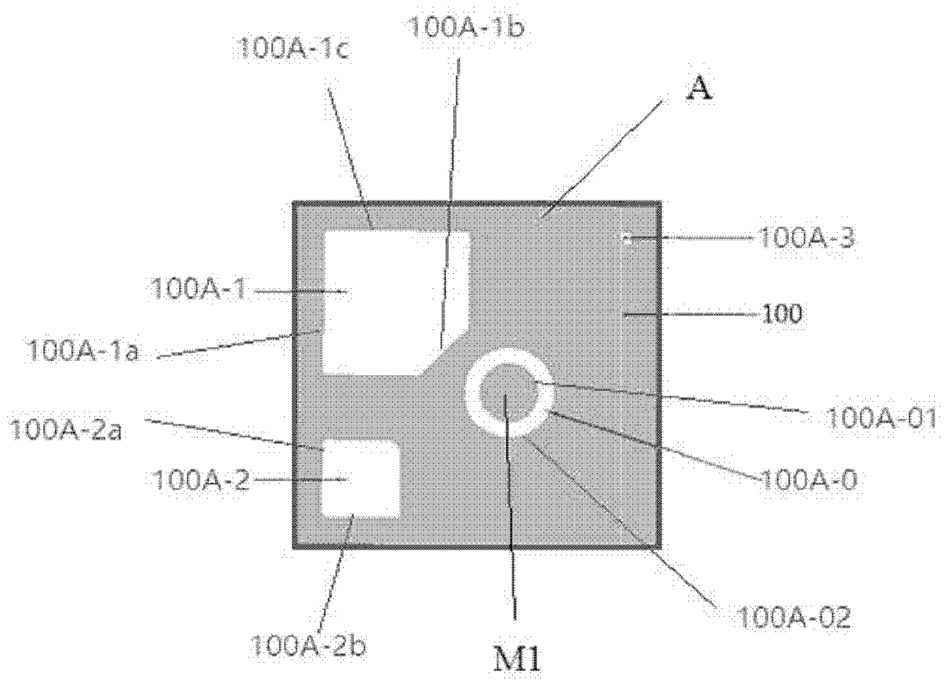
FIG. 3 is an end view of a first face of a triple-mode resonator according to the present disclosure.
Figure 4:
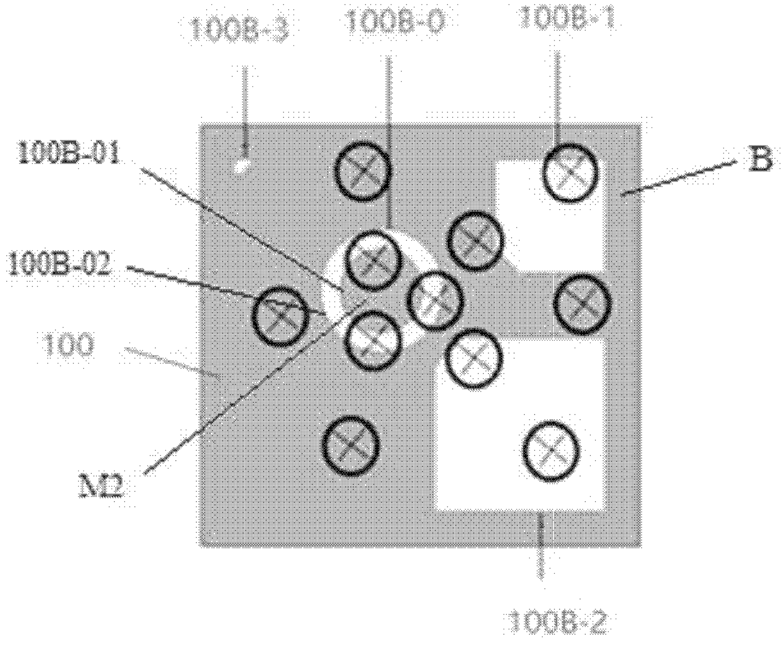
FIG. 4 is an end view of a second face of a triple-mode resonator according to the present disclosure.
Figure 5:
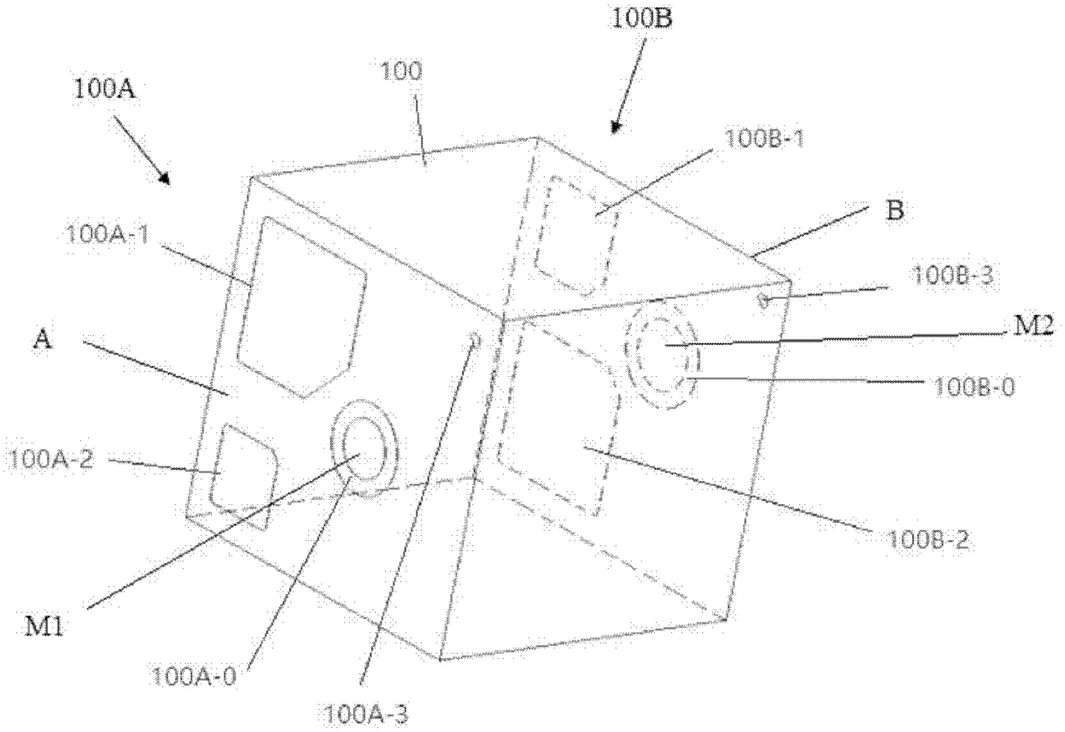
FIG. 5 is perspective view of a triple-mode resonator of the present disclosure.

As shown in FIGS. 3 and 5, the first set of coupling windows 100A comprises an annular coupling window 100A-0 and a plurality of neighboring coupling windows 100A-1, 100A-2, 100A-3 located adjacent to the annular coupling window 100A-0, and as shown in FIGS. 4 and 5, the second set of coupling windows 100B comprises an annular coupling window 100B-0 and a plurality of neighboring coupling windows 100B-1, 100B-2, 100B-3 located adjacent to the annular coupling window 100B-0.

In a preferable embodiment of the annular coupling windows 100A-0, 100B-0, their cross-sections may be embodied in a circular annular shape having an inner edge 100A-01, 100B-01 and an outer edge 100A-02, 100B-02, as shown in FIGS. 2 and 4. A closed region M1, M2 is defined or circled by the inner edge 100A-01, 100B-01. The closed region M1, M2 is positioned substantially within an electric field-concentrated area in the first face or the second face (as particularly shown in FIG. 4) of the main body of the triple-mode resonator 100. Each annular coupling window is configured such that predetermined settings of parasitic zero point can be obtained by its cooperation with neighboring coupling windows 100A-1, 100A-2, 100A-3, 100B-1, 100B-2, 100B-3 on the first and second faces of the main body.

Hereinbelow, the technical term "annular coupling window" here means a slot/opening/aperture or a channel having a cross-section substantially in a ring shape, such as circular ring-shape or square ring-shape, or polygonal or quasi-polygonal ring-shape or any other ring shape having a regular or irregular profile, or a composite coupling window structure consisting of a plurality of sub-windows spaced by the overlay of conductive material but arranged to form a pattern which, as a whole, looks like a composite coupling window substantially in a ring shape.

Figure 6:
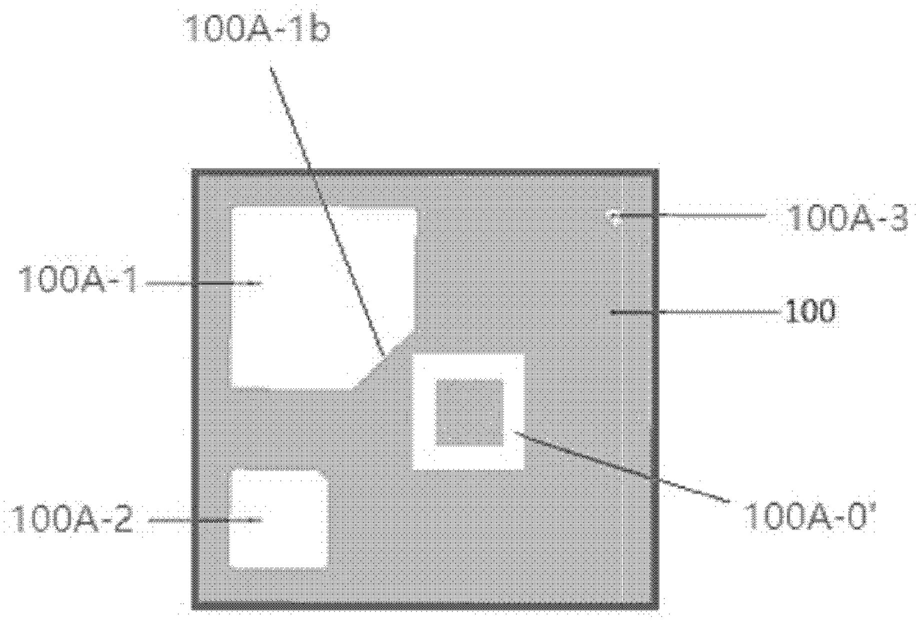
FIG. 6 is an end view of a first face of a triple-mode resonator in which a first variant of the annular coupling window is provided.
Figure 7:
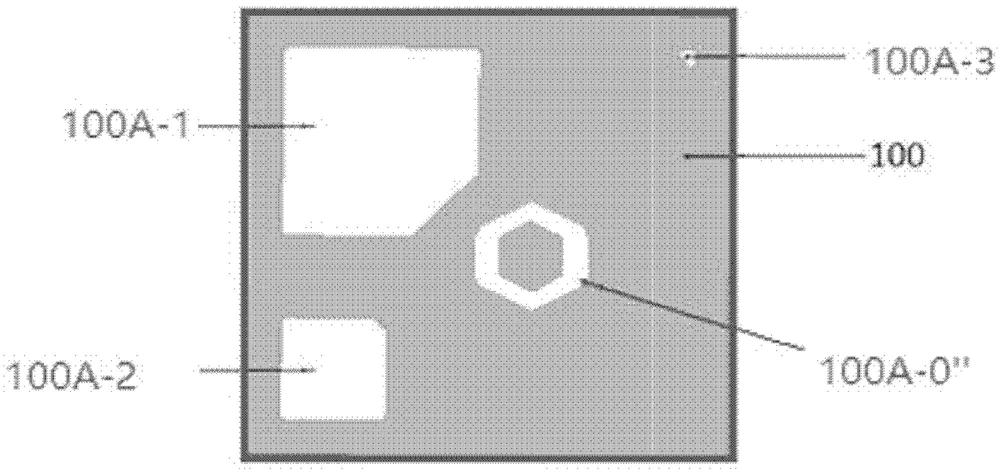
FIG. 7 is an end view of a first face of a triple-mode resonator in which a second variant of the annular coupling window is provided.

Taking the annular coupling window 100A-0, 100A-0', 100A-0" on the first face of the triple-mode resonator 100 for example, its cross-section may be embodied in the form of a circular ring (as shown in FIG. 3), or in the form of a square ring (as shown in FIG. 6), or as a ring bounded with inner and outer polygonal edges (as shown in FIG. 7). Although the annular coupling window 100A-0, 100A-0', 100A-0" shown in FIGS. 3, 6 and 7 are axial symmetric or central symmetric in its cross-section, it can also be designed as an asymmetric ring with or without an irregular inner or outer profile.

Figure 8:
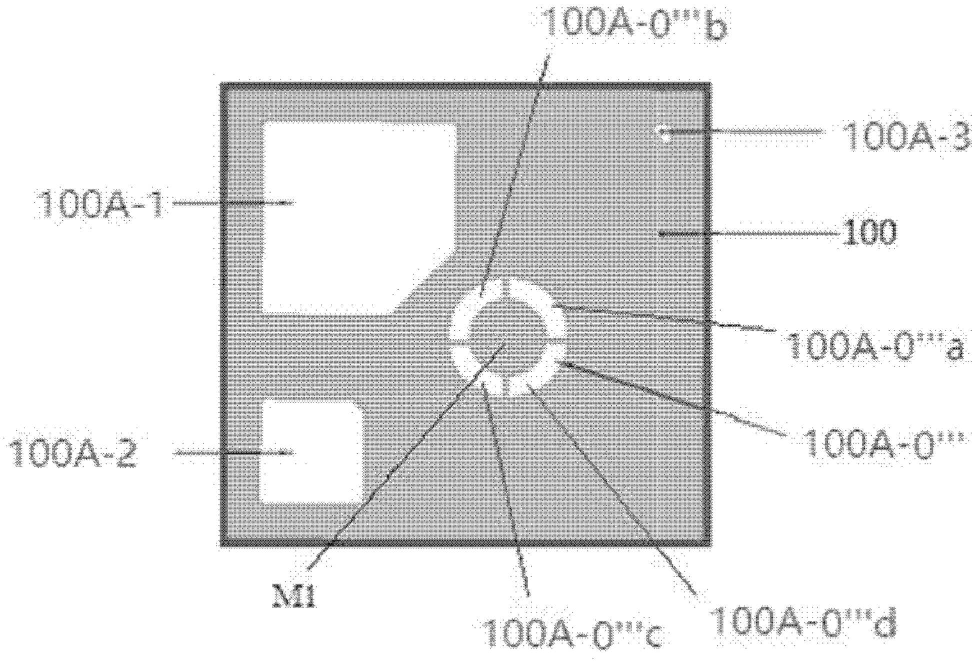
FIG. 8 is an end view of a first face of a triple-mode resonator in which a third variant of the annular coupling window is provided.

In addition to the ring-shaped design in a completely closed shape for the annular coupling window, it can also be designed as a composite coupling window in a generally ring-like shape, which consists of multiple sub-windows spaced from each other by the overlay of conductive material in strips or blocks which occupy such a small proportion in the cross section of the whole composite coupling window that their shielding influence may be negligible. In the embodiment shown in FIG. 8, the annular coupling window 100A-0'" comprises four petal-like sub-windows 100A-0'"*a*, 100A-0'"*b*, 100A-0'"*c*, 100A-0'"*d*, and any two adjacent sub-windows are spaced by a strip-shaped overlay of conductive material extending from the region M1. The strip-shaped overlay of conductive material account for a very small proportion with respect to the annular coupling window in cross-section, such that the whole annular coupling window can still function as desired and may thus deemed as a composite coupling window in a generally annular shape. Although it is shown in FIG. 8 that the composite coupling window is composed of four sub-windows, it can be readily conceived that the number of sub-windows can be varied according to the specific shape or size or location of sub-windows.

Among the first set of coupling windows 100A or the second set of coupling windows 100B, the number of neighboring coupling windows can be two or three or more, which depends on the specific requirement for coupling. In the preferable embodiment as shown in FIG. 2, the neighboring coupling windows are positioned substantially in corner areas of the first and second face of the main body of the triple-mode resonator 100.

According to the first embodiment of the triple-mode resonator, among the first set of coupling windows 100A, three neighboring coupling windows 100A-1, 100A-2, 100A-3 each are located in the corner areas in the first face A of the triple-mode resonator 100. As shown in FIG. 2, when viewed in cross-section, the neighboring coupling window 100A-1, which is located in the upper left corner, is in a substantially rectangular or square shape comprising a first main edge 100A-la extending in the axis z direction, a second main edge 100A-1*c* extending in the axis y direction, and a third main edge 100A-1*b* extending neither parallel nor perpendicular to the first and second main edges. The first main edge 100A-la and the second main edge 100A-1*c* defines a right angle pointing towards the upper left corner in the first face of the triple-mode resonator 100. As shown in FIG. 2, the third main edge 100A-1*b* is embodied in the form of a chamfered edge for the lower-right corner of the neighboring coupling window 100A-1, which is located adjacent to and pointing to the annular coupling window 100A-0.

Figure 9:
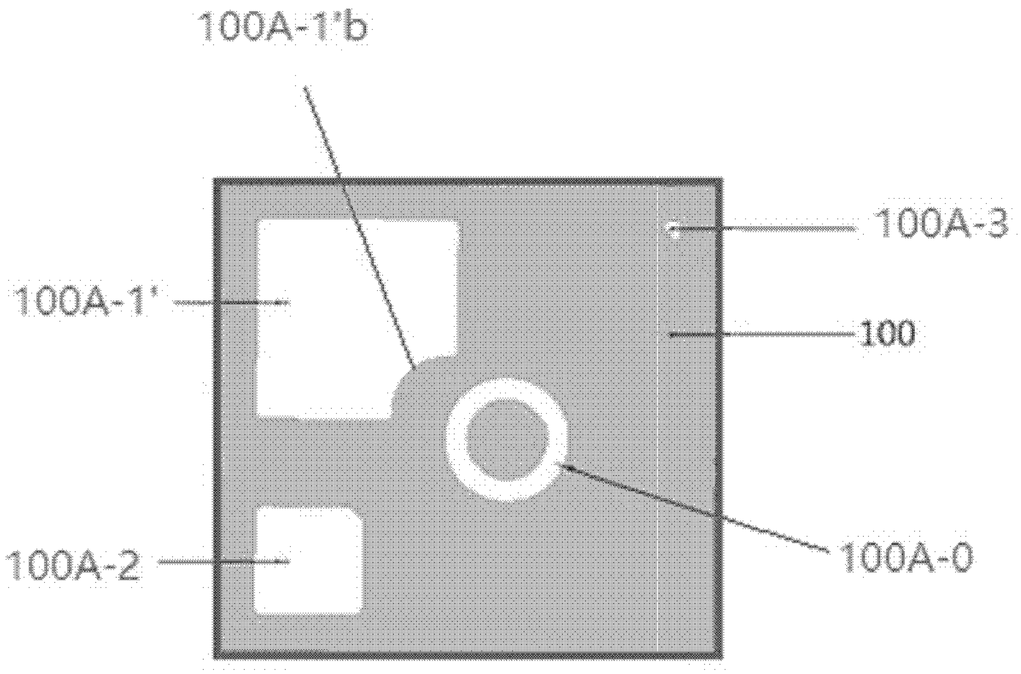
FIG. 9 is an end view of a first face of a triple-mode resonator in which a variant of a neighboring coupling window is provided.

FIG. 9 shows a variant of the third main edge 100A-1*b* of the neighboring coupling window 100A-1. In the embodiment as shown, the neighboring coupling window 100A-1', when viewed in cross-section, comprises a third main edge 100A-1'*b* in the form of an arc segment at its corner located adjacent to and pointing to corresponding annular coupling window. An arc center of the arc-shaped corner thus formed is located outside the boundary of the neighboring coupling window 100A-1'.

Referring to FIG. 2, the cross section of the neighboring coupling window 100A-2, which is located in the lower left corner in the first face A of the triple-mode resonator 100, is in a shape similar to the neighboring coupling window 100A-1, having a first main edge 100A-2*a* extending in the axis z direction and a second main edge 100A-2*c* extending in the axis y direction. The first main edge 100A-2*a* and the second main edge 100A-2*c* intersect to each other at a right angle and define a right-angled corner pointing to the lower-left corner in the first face of the triple-mode resonator 100. The cross section of the neighboring coupling window 100A-2 also has a chamfered edge 100A-2*b* for its upper-right corner which is located adjacent to and pointing to the annular coupling window 100A-0.

The neighboring coupling window 100A-3, which is located in the upper right corner in the first face A of the triple-mode resonator 100, is substantially in a triangle shape, having a first main edge 100A-3*a* extending in the axis z direction, a second main edge 100A-3*b* extending in the axis y direction, and a third main edge 100A-3*c* extending in an inclined direction with respect to the axes z and y. The first main edge 100A-3*a* and the second main edge 100A-3*b* defines a right-angled corner pointing to the upper-right corner in the first face of the triple-mode resonator 100.

The annular coupling window 100B-0 and the neighboring coupling window 100B-1, 100B-2, 100B-3 can be configured in a similar way to the annular coupling window 100A-0 and the neighboring coupling window 100A-1, 100A-2, 100A-3. Although it is shown that there are three neighboring coupling windows in the overlay of conductive material on the first face or the second face of the triple-mode resonator 100, the neighboring coupling windows can be changed in number. For example, the neighboring coupling window 100A-3, 100B-3 can be dispensed with when the neighboring coupling windows 100A-1, 100A-2, 100B-

1, 100B-2 are sized or shaped or positioned in an appropriate manner that allows to provide sufficient coupling as desired.

Referring back to FIG. 5, it can be seen that the first set of coupling windows 100A and the second set of coupling windows 100B are not exactly aligned or corresponding to each other actually. Their arrangement (including the size, shape and location) can be adjusted accordingly for the purpose of optimum coupling performance. According the present disclosure, each annular coupling window 100A-0, 100B-0 is configured such that predetermined setting of parasitic zero point can be obtained by its cooperation with neighboring coupling windows 100A-1, 100A-2, 100A-3, 100B-1, 100B-2, 100B-3 on the first and second faces of the triple-mode resonator 100. That is, by adjusting the configuration of the annular coupling window 100A-0, 100B-0, predetermined transmission position and/or transmission strength and/or polarity of the parasitic zero point can be achieved.

The term "configuration" herein for the annular coupling windows means the size (or dimension) and/or shape of the annular coupling windows when viewed in cross-section.

It is not necessary that the first set of coupling windows 100A and the second set of coupling windows 100B be positioned and/or shaped and/or sized and/or oriented in exactly the same way as shown in FIG. 5. The skilled person in the art can envisage other configurations for the first or second set of coupling windows of the triple-mode resonator 100 as long as they can cooperate to adjust settings of the parasitic zero point as desired.

Referring back to FIG. 1, in the illustrated example, a central axis of the input means 401 is coincident with a central axis of the circular coupling window 1013. Preferably, the central axis of the input means 401 extends through the arc center of the third main edge 100A-1'*b* in the form of the arc segment.

In a preferable embodiment as shown in FIG. 1, the input resonator 103 and the output resonator 104 are configured and aligned in such a manner that they are mirror symmetrical to each other with respect to the symmetry plane of the triple-mode resonator 100 perpendicular to the direction of x axis. Therefore, the coupling windows 1013 and 1024 are coaxial with respect to each other. As shown in FIG. 1, the input means 401 and the output means 402 are substantially coaxially provided with respect to each other. Preferably, the central axis of the input means 401 or the output means 402 is coincident with the central axis of the circular coupling window 1013, 1024 and also extends through the arc center of the third main edge in the form of the arc segment in cross-section of a neighboring coupling window.

Figure 10:
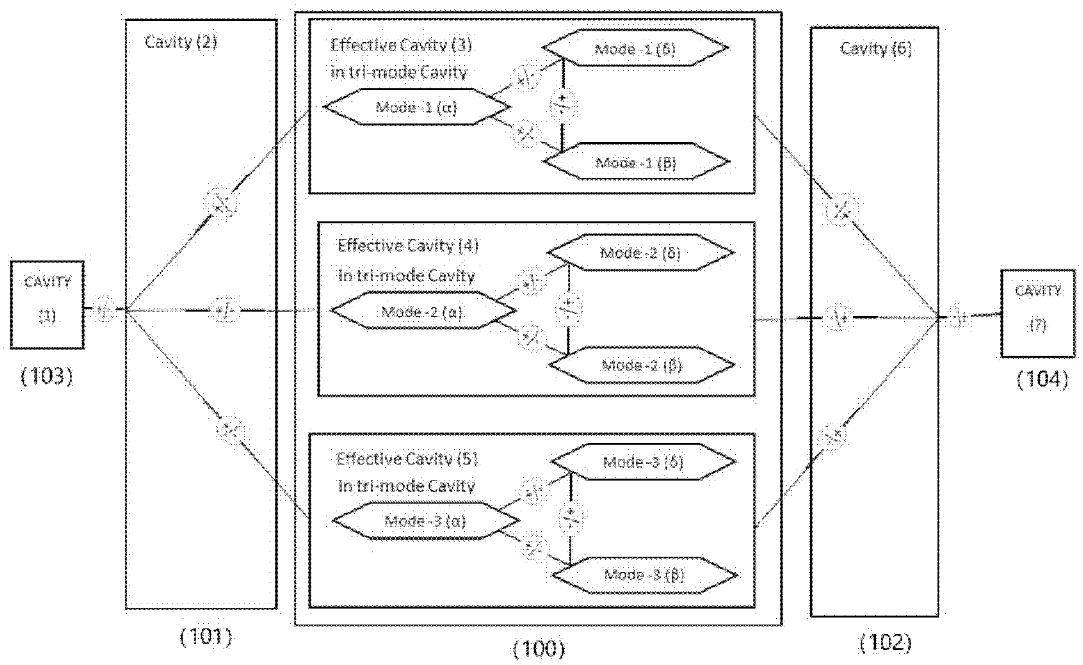
FIG. 10 shows a topology of a waveguide filter of the present disclosure.

For better understanding of the present disclosure, the working principle and technical advantages of the waveguide filter 1 will be expounded as follows:

An E-field excited by the input means 401 inside the input resonator 103, which is in mode-2, is along the direction of x axis and perpendicular to the y-o-z plane. The first intermediate resonator 101 plays as a mode transforming section via the communications associated with the coupling window 1013. Via the coupling window 1013, three dominant resonance modes, i.e. mode-1, mode-2 and mode-3 (as shown in FIG. 10) can be excited in the triple-mode resonator 100.

Particularly, the first main edge 100A-la, 100A-2*a*, 100A-3*a*, 100B-la, 100B-2*a*, 100B-3*a* in cross-section of the neighboring coupling window and the annular coupling window 100A-0, 100B-0 are mainly responsible for coupling from mode-2 in the input resonator 103 to mode-1 in the triple-mode resonator 100. Further, the length and the position of the first main edge 100A-la, 100A-2*a*, 100A-3*a*, 100B-la, 100B-2*a*, 100B-3*a* and the configuration and the position of the annular coupling window 100A-0, 100B-0 define the coupling strength from Mode-2 in the input resonator 103 to Mode-1 in the triple-mode resonator 100 together. That is, the sign of the coupling can be tuned to be either positive or negative by changing the position of the first main edge 100A-la, 100A-2*a*, 100A-3*a*, 100B-1*a*, 100B-2*a*, 100B-3*a* and the annular coupling window 100A-0, 100B. Also, the first main edge 100A-la, 100A-2*a*, 100A-3*a*, 100B-la, 100B-2*a*, 100B-3*a* and the annular coupling window 100A-0, 100B-0 can be precisely designed to tune the cross-coupling between mode-1 inside the triple-mode resonator 100.

The second main edge 100A-1*c*, 100A-2*c*, 100A-3*c*, 100B-1*c*, 100B-2*c*, 100B-3*c* and the annular coupling window 100A-0, 100B-0 are mainly responsible for coupling from mode-2 in the input resonator 103 to mode-3 in the triple-mode resonator 100. The coupling strength from mode-2 in the input resonator 103 to mode-3 in the triple-mode resonator 100 can be adjusted by changing the length and position of the second main edge 100A-1*c*, 100A-2*c*, 100A-3*c*, 100B-1*c*, 100B-2*c*, 100B-3*c* and the configuration and position of the annular coupling window 100A-0, 100B-0. Furthermore, the sign of the coupling can be tuned to be either positive and negative by changing the position of the second main edge 100A-1*c*, 100A-2*c*, 100A-3*c*, 100B-1*c*, 100B-2*c*, 100B-3*c* and the annular coupling window 100A-0, 100B-0. Also, the second main edge 100A-1*c*, 100A-2*c*, 100A-3*c*, 100B-1*c*, 100B-2*c*, 100B-3*c* in cross-section of the neighboring coupling window and the annular coupling window 100A-0, 100B-0 can be precisely designed to tune the cross-coupling between mode-3 inside the triple-mode resonator 100.

The third main edge 100A-1*b*, 100A-2*b*, 100A-3*b*, 100B-1*b*, 100B-2*b*, 100B-3*b* in cross-section of the neighboring coupling window and the annular coupling window 100A-0, 100B-0 are mainly responsible for coupling from mode-2 in the input resonator 301 to mode-2 in the triple-mode resonator 100. In the case where at least one neighboring coupling window, when viewed in cross-section, has a third main edge in the form of an arc segment (as shown in FIG. 9) and the central axis of the input means 401 or the output means 402 extends through the arc center of the arc segment and also is coincident with the center axis of the coaxially provided circular coupling windows 1013, 1024, the coupling efficiency from mode-2 in the input resonator 103 to mode-2 in the triple-mode resonator 100 can reach it maximum value. The coupling efficiency can be reduced by changing the third main edge, for example, from an arc segment into a straight line. Also, the coupling strength can be varied by changing the position and shape of the third main edge of the neighboring coupling window and the position and configuration of the annular coupling window. And the third main edge in cross-section of the neighboring coupling window and the annular coupling window can be precisely designed to tune the cross-coupling between mode-2 inside the triple-mode resonator 100.

FIG. 10 shows the corresponding topology of the waveguide filter 1 as shown in FIG. 1. For better illustration, the triple-mode resonator 100 can be considered as comprising three effective cavities #3, #4, #5 for resonances in mode-1, mode-2 and mode-3 respectively. And the single-mode resonators 103, 101, 102, 104 can be considered as comprising cavities #1, #2, #6, #7 for the single-mode resonance therein respectively. A seven-pole topology with 2 pairs of symmetric zeroes is provided, wherein eight mainline couplings (i.e.

couplings between cavities #1 and #2, between cavities #2 and #3, between cavities #3 and #6, between cavities #2 and #4, between cavities #4 and #6, between cavities #2 and #5, between cavities #5 and #6, between cavities #6 and #7) are provided from corresponding coupling windows on the abutting faces of the resonators. With this topology, the main-coupling and cross-coupling can be freely manipulated to fulfill the transmission function as demanded. As shown in the topology of FIG. 10, cross-couplings between mode-1 and mode-2 in the triple-mode resonator 100, between mode-1 and mode-3 in the triple-mode resonator 100, and between mode-2 and mode-3 in the triple-mode resonator 100 have to be bridged by the first intermediate resonator 101 and the second intermediate resonator 102 respectively.

In view of the above, within the waveguide filter of the present disclosure, productive strong main/negative/capacitive coupling can be provided, which can realize coupling value and shape flexibly.

In case that same dielectric material, for example, ceramic, is chosen for the main bodies of all the resonators in the waveguide filter 1, the waveguide filter 1 can be formed into one piece by casting or ceramic injection molding. In this way, the assembling steps required for connecting all the resonators in series can be dispensed with and the production efficiency can thus be improved.

Although it is shown in FIG. 1 that five resonators are coupled to form a filter, the number of resonators/filter poles can be changed so as to influence the near band attenuation/selectivity of the filter as expected. Under the same order of filter, the number of zeroes or the number of cross couplings can make great help to optimize the near band attenuation performance of filter.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A triple-mode resonator, comprising:

a main body having a block of a dielectric material and an overlay of conductive material on the block;

a first set of coupling windows, which are provided in the overlay of conductive material on a first face of the main body to be coupled with a first single-mode resonator, and through which signals can be coupled into the main body; and a second set of coupling windows, which are provided in the overlay of conductive material on a second face of the main body to be coupled with a second single-mode resonator, and through which signals can be coupled out of the main body, wherein the first and second sets of coupling windows each comprise an annular coupling window and a plurality of neighboring coupling windows located adjacent to the annular coupling window, when viewed in cross-section, a substantially closed region defined by an inner edge of each annular coupling window is positioned substantially within an electric field-concentrated area respectively associated with the first or second face of the main body, and each annular coupling window is configured such that predetermined settings of parasitic zero point can be obtained by its cooperation with neighboring coupling windows on the first and second faces of the main body.

2. The triple-mode resonator according to claim 1, wherein at least one of the annular coupling windows, when viewed in cross-section, is substantially in a circular annular shape or a square annular shape or a polygonal annular shape.

3. The triple-mode resonator according to claim 1, wherein the first and second sets of coupling windows each comprise two or three neighboring coupling windows.

4. The triple-mode resonator according to claim 1, wherein the main body has a cuboid shape defining three orthogonal axes (x, y, z) each substantially perpendicular to a respective face of the main body, and the plurality of neighboring coupling windows are positioned substantially in corner areas of the first or second face of the main body.

5. The triple-mode resonator according to claim 4, wherein at least one of the plurality of neighboring coupling windows, when viewed in cross-section, is in a substantially triangle or rectangular or square shape, having at least two adjacent edges orthogonal to each other and each extending along one of the three orthogonal axes (x, y, z).

6. The triple-mode resonator according to claim 5, wherein the at least one neighboring coupling window, when viewed in cross-section, has a chamfered corner which is located adjacent to and points to a corresponding annular coupling window.

7. The triple-mode resonator according to claim 5, wherein the at least one neighboring coupling window, when viewed in cross-section, has an arc-shaped corner which is located adjacent to and points to a corresponding annular coupling window and which has an arc center located outside its boundary.

8. The triple-mode resonator according to claim 1, wherein the first face is opposite to the second face.

9. The triple-mode resonator according to claim 1, wherein the dielectric material is ceramic.

10. A waveguide filter, comprising a triple-mode resonator according to claim 1, the first single-mode resonator comprising a block of a dielectric material and an overlay of conductive material on the block, and the second single-mode resonator comprising a block of a dielectric material and an overlay of conductive material on the block, wherein the triple-mode is sandwiched between the first and second single-mode resonators in such a manner that the triple-mode resonator is coupled with the first single-mode resonator via the first set of coupling windows and is coupled with the second single-mode resonator via the second set of coupling windows.

11. The waveguide filter according to claim 10, wherein the waveguide filter further comprises a third single-mode resonator comprising a block of a dielectric material and an overlay of conductive material on the block, and the third single-mode resonator is coupled with the first single-mode resonator via corresponding coupling windows formed in the overlay of conductive material on their abutting faces.

12. The waveguide filter according to claim 11, wherein the coupling windows for the coupling between the third single-mode resonator and the first single-mode resonator are in the form of circular slots or channels.

13. The waveguide filter according to claim 12, wherein on a face of the third single-mode resonator facing away from the first single-mode resonator, an input means is connected to the dielectric material of the third single-mode resonator for supplying a signal.

14. The waveguide filter according to claim 13, wherein a central axis of the input means is substantially coincident with a central axis of the coupling windows between the third and first single-mode resonators.

15. The waveguide filter according to claim 14, wherein the waveguide filter further comprises a fourth single-mode resonator comprising a block of a dielectric material and an overlay of conductive material on the block, and the fourth single-mode resonator is coupled with the second single-mode resonator via corresponding coupling windows formed in the overlay of conductive material on their abutting faces.

16. The waveguide filter according to claim 15, wherein on a face of the fourth single-mode resonator facing away from the second single-mode resonator, an output means is connected to the dielectric material of the fourth single-mode resonator for outputting a filtered signal.

17. The waveguide filter according to claim 16, wherein the third single-mode resonator and the fourth single-mode resonator are mirror symmetrical to each other, and the input means and the output means are coaxial with respect to each other.

18. The waveguide filter according to claim 17, wherein at least one of the plurality of neighboring coupling windows of the first or second set of coupling windows on the triple-mode resonator, when viewed in cross-section, has an arc-shaped corner which is located adjacent to and points to a corresponding annular coupling window and which has an arc center located outside its boundary, and a central axis of the input means extends through an arc center of the arc-shaped corner.

19. The waveguide filter according to claim 10, wherein the waveguide filter is formed into one piece by casting or by injection molding.

* * * * *